United States Patent
Hotson et al.

(10) Patent No.: US 11,741,354 B2
(45) Date of Patent: Aug. 29, 2023

(54) SHARED PROCESSING WITH DEEP NEURAL NETWORKS

(71) Applicant: Ford Global Technologies, LLC, Dearborn, MI (US)

(72) Inventors: Guy Hotson, Palo Alto, CA (US); Vidya Nariyambut Murali, Sunnyvale, CA (US); Gintaras Vincent Puskorius, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1493 days.

(21) Appl. No.: 15/687,247

(22) Filed: Aug. 25, 2017

(65) Prior Publication Data
US 2019/0065944 A1    Feb. 28, 2019

(51) Int. Cl.
*G06N 3/08* (2023.01)
*G06N 3/084* (2023.01)
(Continued)

(52) U.S. Cl.
CPC ............. *G06N 3/08* (2013.01); *G06N 3/044* (2023.01); *G06N 3/045* (2023.01); *G06N 3/084* (2013.01)

(58) Field of Classification Search
CPC ........ G06N 3/08; G06N 3/084; G06N 3/0454; G06N 3/0445; G05D 1/0214;
(Continued)

(56) References Cited

U.S. PATENT DOCUMENTS
9,563,840 B2    2/2017 Krizhevsky
2016/0026913 A1    1/2016 Moon
(Continued)

FOREIGN PATENT DOCUMENTS
CN    106096670 A    11/2016
CN    106599939 A    4/2017

OTHER PUBLICATIONS

S. Jeong, J. Kim, S. Kim and J. Min, "End-to-end learning of image based lane-change decision", Jun. 11-14, 2017 IEEE Intelligent Vehicles Symposium (IV), 2017, pp. 1602-1607, doi: 10.1109/IVS.2017.7995938. (Year: 2017).*

(Continued)

*Primary Examiner* — Michael J Huntley
*Assistant Examiner* — Imad Kassim
(74) *Attorney, Agent, or Firm* — David R. Stevens; Stevens Law Group (57) ABSTRACT

A system includes a processor for performing one or more autonomous driving or assisted driving tasks based on a neural network. The neural network includes a base portion for performing feature extraction simultaneously for a plurality of tasks on a single set of input data. The neural network includes a plurality of subtask portions for performing the plurality of tasks based on feature extraction output from the base portion. Each of the plurality of subtask portions comprise nodes or layers of a neutral network trained on different sets of training data, and the base portion comprises nodes or layers of a neural network trained using each of the different sets of training data constrained by elastic weight consolidation to limit the base portion from forgetting a previously learned task.

20 Claims, 6 Drawing Sheets

(51) Int. Cl.
*G06N 3/044* (2023.01)
*G06N 3/045* (2023.01)

(58) Field of Classification Search
CPC .... G05D 1/0221; G05D 1/0236; G05D 1/024; G05D 1/0242; G05D 1/0246; G05D 1/0255; G05D 1/0257; G05D 1/0276; G05D 1/0278; G05D 2201/02
See application file for complete search history.

(56) References Cited

U.S. PATENT DOCUMENTS

| | | | | |
|---|---|---|---|---|
| 2016/0140438 A1* | 5/2016 | Yang | ...................... | G06N 3/045 706/12 |
| 2018/0188938 A1* | 7/2018 | Deselaers | ........... | G06F 3/04883 |
| 2018/0336430 A1* | 11/2018 | Sato | ........................ | G06V 10/82 |
| 2019/0236482 A1* | 8/2019 | Desjardins | ............... | G06N 3/08 |

OTHER PUBLICATIONS

Kirkpatrick "Overcoming catastrophic forgetting in neural networks", Mar. 28, 2017, vol. 114, No. 13, pp. 3521-3526 (Year: 2017).*

Mingsheng Long, "Learning Multiple Tasks with Deep Relationship Networks", May 26, 2017 (Year: 2017).*

Lee et al. ("VPGNet: Vanishing Point Guided Network for Lane and Road Marking Detection and Recognition", 2017, pp. 1947-1955) (Year: 2017).*

Evolving Neural Networks That Suffer Minimal Catastrophic Forgetting.

Mitigation of catastrophic forgetting in recurrent neural networks using a Fixed Expansion Layer.

Overcoming Catastrophic Forgetting by Incremental Moment Matching.

* cited by examiner

SHARED PROCESSING WITH DEEP NEURAL NETWORKS

TECHNICAL FIELD

The disclosure relates generally to systems and methods for shared processing in deep neural networks and more particularly relates to shared processing with deep neural networks using elastic weight consolidation in assisted and autonomous driving applications.

BACKGROUND

Automobiles provide a significant portion of transportation for commercial, government, and private entities. Autonomous vehicles and driving assistance systems are currently being developed and deployed to provide safety, reduce an amount of user input required, or even eliminate user involvement entirely. For example, some driving assistance systems, such as crash avoidance systems, may monitor driving, positions, and a velocity of the vehicle and other objects while a human is driving. When the system detects that a crash or impact is imminent the crash avoidance system may intervene and apply a brake, steer the vehicle, or perform other avoidance or safety maneuvers. As another example, autonomous vehicles may drive and navigate a vehicle with little or no user input.

Autonomous or assisted driving systems often utilize data from sensors to determine information about an environment surrounding a vehicle. In some cases, this data must be processed to detect objects, roadways, or make driving or assisted driving decisions. Because of the wide range of scenarios, objects, or complex situations that may be presented to an autonomous or assisted driving vehicle, the computing load can be quite high. In some cases, the computing load presents a limit on the functions or features that can be provided by an autonomous or assisted driving system.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

In many machine learning applications, multiple tasks must be accomplished simultaneously using the same input or inputs. For example, autonomous vehicles may need to perform object detection, semantic scene segmentation, and lane finding all using the same input image (or same set of input images). Each of these tasks may benefit from using a convolutional network (CNN) for feature extraction. In order to drastically reduce computation time, the same CNN base network may be used for each task. However, finding data suitable for training each task simultaneously is often impossible. Furthermore, if the base CNN is fine-tuned for each task sequentially, then the weights will be overwritten every time a new task is added.

Applicants have recognized that the use of elastic weight consolidation (EWC) on a base CNN that is then connected to multiple other networks for accomplishing various tasks may be used to reduce computational load while limiting "forgetting" of previously learned tasks. EWC has recently been used to enable a single deep neural network to sequentially learn how to play multiple Atari games. See James Kirkpatrick et al. "Overcoming catastrophic forgetting in neural networks", Proceedings of the National Academy of Sciences (2017), which describes the use of EWC and which is hereby incorporated by reference herein in its entirety. When switching to a new task, the weights of the network are protected proportionately to how important they were for the previous tasks. In this manner, the network retains memories of how to perform previous tasks while learning how to accomplish the new one. In the present disclosure, the term "forgetting" is used to describe how the learned weights or values in a neural network can be lost or changed to a degree that the neural network can no longer perform a task at a desired level. The term "memory" is used to describe how the learned weights or values in a neural network can be retained, even after further training, such that the neural network can continue to perform a task at a desired level.

In the present disclosure, Applicants propose and present methods, systems, and devices that use EWC on only a subset of a network. Many deep learning tasks can be subdivided into multiple stages, with one of the first stages entailing feature extraction using a CNN. A large amount of computation time can be saved if the same CNN is used for feature extraction across tasks. When teaching a CNN to extract the appropriate features for a new task, it is prudent to not lose the ability to extract features for the old ones. Embodiments are not limited to the use of CNNs constrained by EWC. Rather, other network types, such as a recurrent neural network (RNN) may be used in some embodiments.

Applicants propose making use of EWC on a base neural network (e.g., a CNN) for feature extraction network. This network can then be sequentially connected to multiple new networks for training different tasks, such as object detection, image segmentation, and lane finding with RGB images. Once the CNN has been fine-tuned for each of these subtasks, the CNN can be connected during deployment to all of the networks for the desired subtasks at the same time. This enables sequentially training for each task on different datasets while simultaneously performing each of the subtasks on new images during deployment.

According to one embodiment, a method for training a neural network for a plurality of deep learning tasks may include training a base portion of a neural network and a first task portion for a first task. The method may include subsequently training the base portion and a second task portion to perform a second task. The base portion is constrained using EWC during training of the second task to retain memory for performing feature extraction for the first task. Any number of additional tasks may also be trained while constraining the base portion using EWC. In one embodiment, training for the first task includes training with the first task portion receiving the output of the base portion and the second task portion not connected, and training for the second task includes training with the second task portion receiving the output of the base portion and the first task portion not connected.

According to one embodiment, a system or device may process a set of sensor data using a neural network, the neural network including a base portion and a plurality of task portions. The base portion receives the set of sensor data at an input layer and outputs to each of the plurality of task portions, wherein each of the plurality of task portions outputs a result of a task based on the outputs of the base portion. The system may perform an automated or assisted driving task based on the outputs of the plurality of task portions. The base portion includes layers of a neural network that have together been sequentially trained for each of the plurality tasks. Training of the base portion for at least one task is constrained by using EWC to preserve performance for a previous task.

A system may include a processor for performing one or more autonomous driving or assisted driving tasks based on a neural network. The neural network includes a base portion for performing feature extraction simultaneously for a plurality of tasks on a single set of input data and a plurality of subtask portions for performing the plurality of tasks based on feature extraction output from the base portion. Each of the plurality of subtask portions include nodes or layers of a neural network trained on different sets of training data. The base portion includes nodes or layers of a neural network trained using each of the different sets of training data constrained by EWC to limit the base portion from forgetting a previously learned task.

By using EWC on only a subset of the network, processes or tasks that are common between different neural networks may be combined into a single network. This can reduce computing resources during deployment because the common task (e.g., feature extraction) is only performed once for each image and that feature extraction information may then be used by specialized portions of the network to perform desired tasks. Furthermore, a reduced training load or faster training may also be achieved because the base portion of a network may only need slight changes between for a second task after training for a first task. Furthermore, the use of a EWC constrained subset of a network may allow for reductions in the restrictions on training data. For example, if a neural network were to be trained for multiple tasks, a single set of training data with all the proper labels may be needed. Because the base neural network can be trained using EWC to avoid forgetting previous tasks, disparate training data labeled for only a single task, or less than all desired tasks, may be used during sequential training steps.

Figure 1:
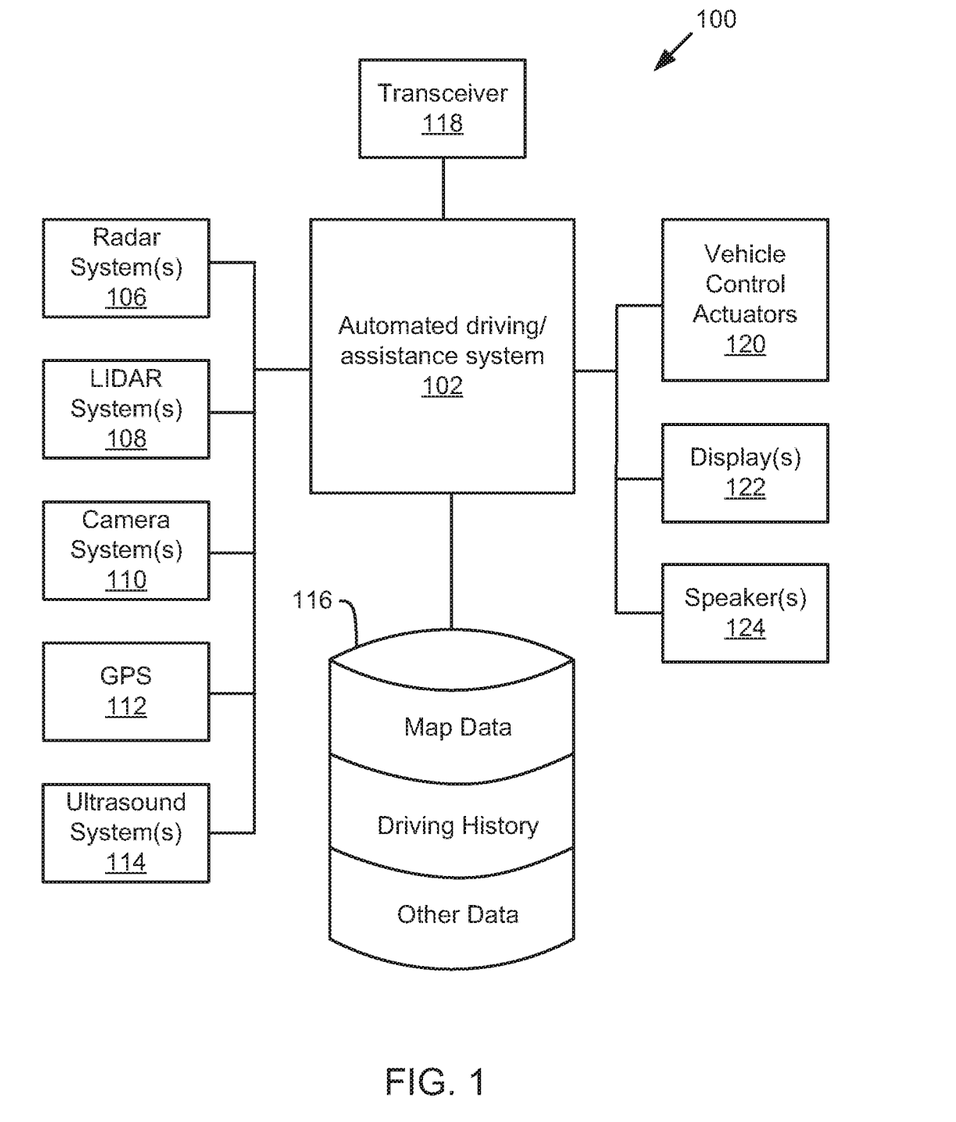
FIG. 1 is a schematic block diagram illustrating an implementation of a vehicle control system that includes an automated driving/assistance system.

Referring now to the figures, FIG. 1 illustrates an example vehicle control system 100 that may be used for autonomous or assisted driving. The automated driving/assistance system 102 may be used to automate or control operation of a vehicle or to provide assistance to a human driver. For example, the automated driving/assistance system 102 may control one or more of braking, steering, acceleration, lights, alerts, driver notifications, radio, or any other auxiliary systems of the vehicle. In another example, the automated driving/assistance system 102 may not be able to provide any control of the driving (e.g., steering, acceleration, or braking), but may provide notifications and alerts to assist a human driver in driving safely. The automated driving/assistance system 102 may use a neural network, or other model or algorithm to detect or localize objects based on perception data gathered by one or more sensors.

The vehicle control system 100 also includes one or more sensor systems/devices for detecting a presence of objects near or within a sensor range of a parent vehicle (e.g., a vehicle that includes the vehicle control system 100). For example, the vehicle control system 100 may include one or more radar systems 106, one or more LIDAR systems 108, one or more camera systems 110, a global positioning system (GPS) 112, and/or one or more ultrasound systems 114. The vehicle control system 100 may include a data store 116 for storing relevant or useful data for navigation and safety such as map data, driving history or other data. The vehicle control system 100 may also include a transceiver 118 for wireless communication with a mobile or wireless network, other vehicles, infrastructure, or any other communication system.

The vehicle control system 100 may include vehicle control actuators 120 to control various aspects of the driving of the vehicle such as electric motors, switches or other actuators, to control braking, acceleration, steering or the like. The vehicle control system 100 may also include one or more displays 122, speakers 124, or other devices so that notifications to a human driver or passenger may be provided. A display 122 may include a heads-up display, dashboard display or indicator, a display screen, or any other visual indicator which may be seen by a driver or passenger of a vehicle. A heads-up display may be used to provide notifications or indicate locations of detected objects or overlay instructions or driving maneuvers for assisting a driver. The speakers 124 may include one or more speakers of a sound system of a vehicle or may include a speaker dedicated to driver notification.

It will be appreciated that the embodiment of FIG. 1 is given by way of example only. Other embodiments may include fewer or additional components without departing from the scope of the disclosure. Additionally, illustrated components may be combined or included within other components without limitation.

In one embodiment, the automated driving/assistance system 102 is configured to control driving or navigation of a parent vehicle. For example, the automated driving/assistance system 102 may control the vehicle control actuators 120 to drive a path on a road, parking lot, driveway or other location. For example, the automated driving/assistance system 102 may determine a path based on information or perception data provided by any of the components 106-118. The sensor systems/devices 106-110 and 114 may be used to obtain real-time sensor data so that the automated driving/assistance system 102 can assist a driver or drive a vehicle in real-time.

In one embodiment, the automated driving/assistance system 102 may process sensor data, make decisions, or control operation of a vehicle control system 100 using one or more neural networks. The neural networks may include networks that were previously trained for a plurality of tasks. The neural networks may be used, for example, to detect one or more different types of objects, road boundaries, drivable surfaces, or the like. In fact, any detection, decision making, or other task or decision performed by an automated driving/assistance system may be at least partially implemented using a neural network. In one embodiment, tasks that use a similar type of data or have at least similar needs at a stage may share a common portion of one or more layers that have been trained, or are trained, for different tasks while being constrained by EWC.

Figure 2:
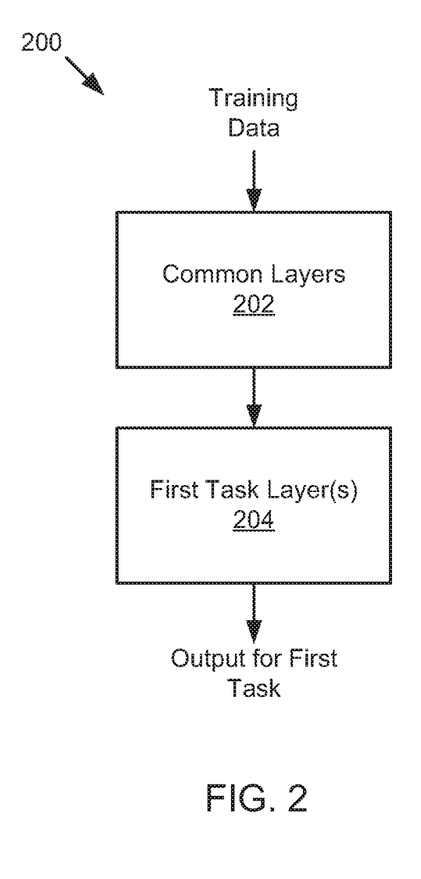
FIG. 2 is a schematic block diagram illustrating a structure of a neural network during training for a first task, according to one implementation.
Figure 3:
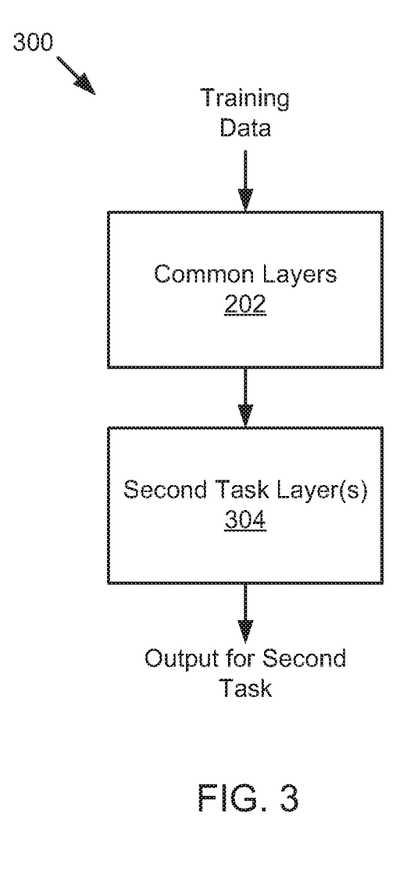
FIG. 3 is a schematic block diagram illustrating a structure of a neural network during training for a second task, according to one implementation.
Figure 4:
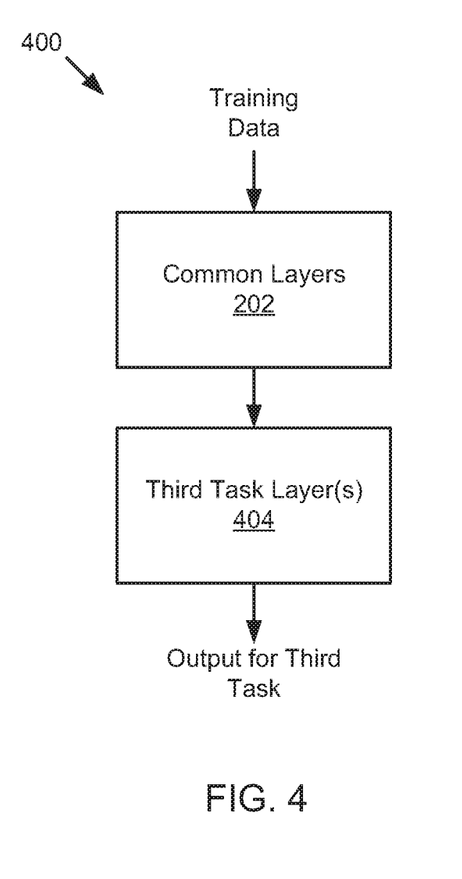
FIG. 4 is a schematic block diagram illustrating a structure of a neural network during training for a third task, according to one implementation.

FIGS. 2-4 are schematic block diagrams illustrating training of layers or subsets of a neural network for multiple tasks with one or more common layers 202 constrained by EWC. FIG. 2 illustrates a neural network 200 during training of common layers 202 and first task layers 204 for a first task. The common layers 202 may receive training data, such as an image and a label for the image corresponding to the first task. The label may correspond to the desired output for the first task. Using a training algorithm, such as a loss function and back propagation, values for the nodes or edges in the common layers 202 and first task layers 204 may be modified. This process can be repeated for each image, or set of data, within the training data. Performance of the neural network 200 against a body of testing data may be used to confirm whether the neural network 200 performs acceptably. Furthermore, EWC constraints for the common layers 202 in the form of a Fisher information matrix may be computed so that it is known what values in the common layers 202 are important for the first task.

FIG. 3 illustrates a neural network 300 during training of the common layers 202 and second task layers 304 for a second task. The common layers 202 may receive training data, such as an image and a label for the image corresponding to the second task. Note that the common layers 202 may include the values and weights determined during training of the first task in the neural network 200 of FIG. 2. The label may correspond to the desired output for the second task. Using a training algorithm, such as a loss function and back propagation, values for the nodes or edges in the common layers 202 and second task layers 304may be modified. Any modifications to the common layers 202 may be constrained using EWC based on the constraints calculated for the first task. This process can be repeated for each image, or set of data, within the training data. The training data include different or the same training sets used during training of the first task. For example, while the labels may be different, images used in training may be the same or different. Because different images may be used, it is not necessary to use the same images, labeled for different tasks, between training steps. This can significantly reduce complexity in training because existing sets of training data with their existing labels may be used. This is contrasted for situations where the exact same set of training data may need to include labels for each desired task that is to be performed by a neural network.

After training, performance of the neural network 300 against a body of testing data may be used to confirm whether the neural network 300 performs acceptably. For example, performance for the second task as well as the first task may be tested again with the revised weights or values in the common layers 202. Furthermore, EWC constraints for the common layers 202 in the form of a Fisher information matrix may be computed so that it is known what values in the common layers 202 are important for the first and second tasks.

FIG. 4 illustrates a neural network 400 during training of the common layers 202 and third task layers 404 for a third task. The common layers 202 may receive training data, such as an image and a label for the image corresponding to the third task. Note that the common layers 202 may include the values and weights determined based on training of the first and second tasks in the neural networks 200 and 300 of FIGS. 2-3. The label may correspond to the desired output for the third task. Using a training algorithm, such as a loss function and back propagation, values for the nodes or edges in the common layers 202 and third task layers 404 may be modified. It should be noted that since the first task layers 204 and second task layers 304 are not included during training of the neural network 400 for the third task, the values or weights in the task layers 204 and second task layers 304 are not changed during training o the third task. Any modifications to the common layers 202 may be constrained using EWC based on the constraints calculated for the first and second tasks. This process can be repeated for each image, or set of data, within the training data. The training data may include different or the same training sets used during training of the first or second task. For example, while the labels may be different (specific to the third task), images used in training may be the same or different. Because different images may be used, it is not necessary to use the same images, labeled for different tasks, between training steps.

After training, performance of the neural network 400 against a body of testing data may be used to confirm whether the neural network 400 performs acceptably. For example, performance for the second task as well as the first task may be tested again with the revised weights or values in the common layers 202. Furthermore, EWC constraints for the common layers 202 in the form of a Fisher information matrix may be computed so that it is known what values in the common layers 202 are important for the first, second, and third tasks.

Any additional tasks may be trained in a similar way using the common layers as a base or feature extraction portion for a neural network.

Figure 5:
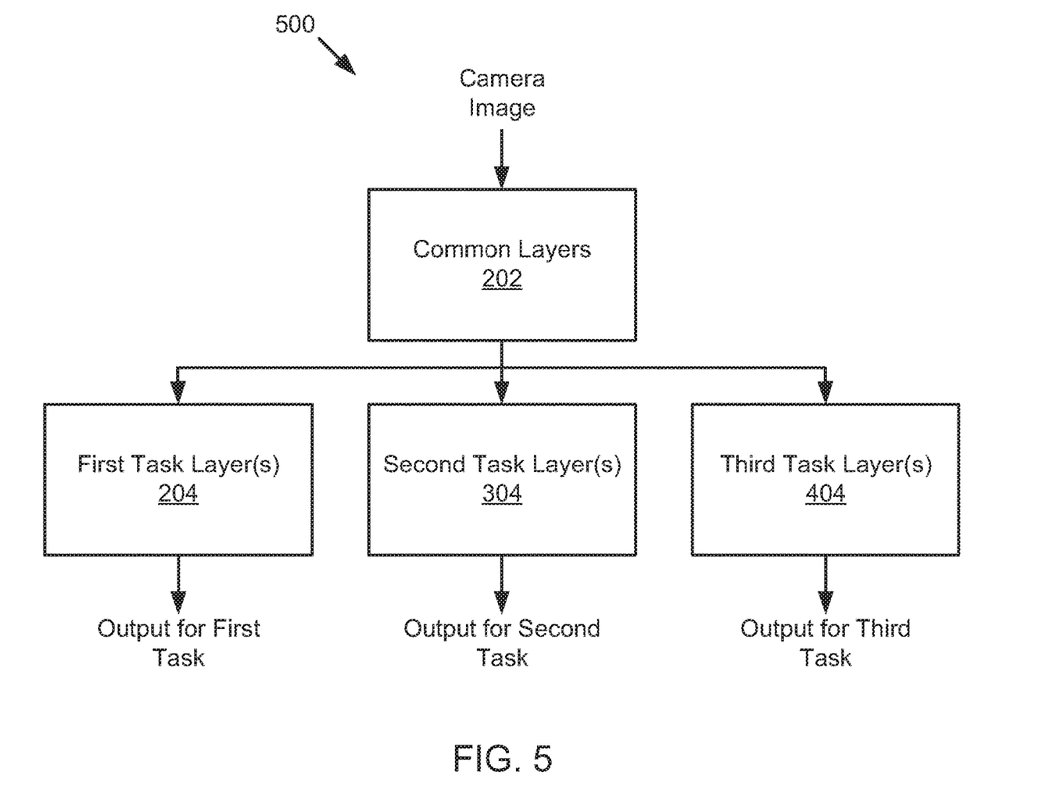
FIG. 5 is a schematic block diagram illustrating a structure of a neural network trained to perform a plurality of tasks, according to one implementation.

FIG. 5 is a schematic block diagram illustrating a neural network 500 which may be used for testing performance for the different tasks or during deployment. The neural network 500 includes the common layers 202 which have been trained during training for each of the first, second, and third tasks. The neural network 500 also includes the first task layers 204 which were trained during training for a first task, the second task layers 304 which were trained during training for a second task, and the third task layers 404 which were trained during training for a third task. The output(s) of the common layers 202 are provided as inputs to each of the first task layers 204, second task layers 304, and the third task layers 404. Thus, the computations in the common layers 202 only need to be performed once for all of the trained tasks. Because EWC was used to constrain the common layers 202 during training, performance for each of the trained tasks may still be very good.

By way of example, a single camera image (or other single set of sensor data) may be provided to the common layers 202 which act as a base portion of the neural network 500. The common layers 202 perform feature extraction on the image and provide one or more output values that reflect the feature extraction. Because the common layers 202 were trained using EWC for each of the tasks, the single feature extraction extract features needed by all of the tasks. The feature extraction values are output to the subtask portions including the first task layers 204, the second task layers 304, and the third task layers 404. Each of the first task layers 204, the second task layers 304, and the third task layers 404 process the feature extraction values from the common layers 202 to determine outputs for their respective tasks.

It is understood by one of skill in the art that a single neural network 500 is composed of a plurality of nodes and edges connecting the nodes. Weights or values for the edges or nodes is used to compute an output for an edge connecting to a subsequent node. A single neural network 500 may thus be composed of a plurality of neural networks to perform one or more tasks. The neural network 500 of FIG. 5 includes some common layers 202 as a base portion or common portion of the neural network 500. The common layers 202 may be understood as forming a sub network of the neural network 500. The computations and processing done in the common layers 202 are then used by the first task layers 204, second task layers 206, and third task layers 404. Thus, the neural network 500 includes a branching topology where the results of the common layers 202 is then used independently by each of a plurality of subnetworks in branches of the neural network 500. Because the common layers 202 were trained sequentially on a plurality of tasks while using EWC to avoid forgetting previously trained tasks, the common layers 202 may perform a task that serves each of the neural network branches well. Furthermore, the common layers 202 result in reduced computing because the task of the common layers 202 is performed once for all tasks represented by the branches, instead of once for each task. One example of the task to be performed by the common layers 202 is feature extraction. However, any tasks that may have a shared initial processing task may share common layers.

Figure 6:
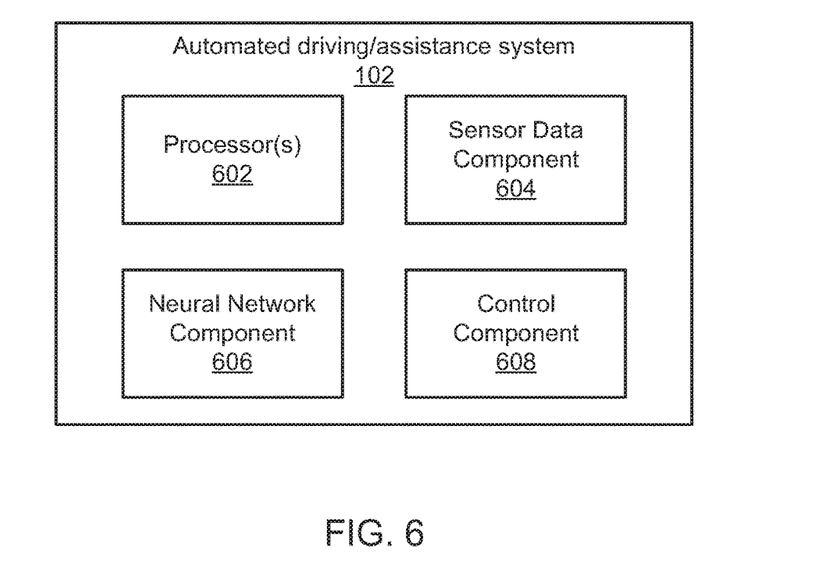
FIG. 6 is a schematic block diagram illustrating components of an automated driving/assistance system, according to one implementation.

FIG. 6 is a schematic block diagram illustrating some components of an automated driving/assistance system 102, according to one embodiment. The automated driving/assistance system 102 includes one or more processors 602, a sensor data component 604, a neural network component 606, and a control component 608. The components 602-608 are given by way of illustration only and may not all be included in all embodiments. In fact, some embodiments may include only one or any combination of two or more of the components 602-608. For example, some of the components 602-608 may be located outside or separate from the automated driving/assistance system 102. Furthermore, the components 602-608 may include hardware, processors, computer readable instructions, or a combination of both to perform the functionality and provide the structures discussed herein.

The processors 602 may include any type of processors or processing circuits. In one embodiment, the processors 602 may include a conventional desktop, laptop, or server central processing unit (CPU). In one embodiment, the processors 602 may include multiple parallel processors such as those found in a graphics processing unit (GPU) or accelerated processing unit (APU). Parallel processing may be helpful for performing the computations required by a neural network.

The sensor data component 604 obtains sensor data from one or more sensors. For example, the sensor data component 604 may receive sensor data from one or more of a radar system 106, LIDAR system 108, camera system 110, GPS 112, ultrasound system, or other sensor or sensing system. The sensor data may be used for various tasks in a driving environment such as object detection, image segmentation, lane detection, driving surface detection, driving condition detection, or any other task. The sensor data component 604 may provide the sensor data to the neural network component 606. For example, the sensor data component 604 may provide a single red-green-blue (RGB) image, infrared image, frame of LIDAR data, or frame of radar data at a time for processing by the neural network.

The neural network component 606 may store a neural network and/or implement computations based on a neural network and/or values or weights within a neural network to process sensor data. In one embodiment, the neural network component 606 processes a set of sensor data (such as a frame or other set of data) using a neural network that includes a base portion and a plurality of task portions. The base portion may include common layers that perform a task, such as feature extraction, for each of the plurality of task portions. The base portion, or common layers, may receive the set of sensor data at an input layer and output to each of the plurality of task portions. Each of the plurality of task portions outputs a result of a task based on the outputs of the base portion.

The base portion, or common layers of the base portion, may include weights or values trained for a plurality of different tasks. During training the weights or values may have been constrained using EWC to limit forgetting the training learned for previous tasks. The base portion may include a CNN or RNN that performs a task that will benefit each of the specific tasks or subtasks to be performed by the task portions. In one embodiment, at least two of the plurality of task portions are trained on different data sets. When the plurality of task portions are trained on different data sets, the base portion (or common layers) may also be trained sequentially on different data sets by training for a first task based on a first data set of the different data sets while connected to a first of the at least two of the plurality of task portions and training for a second task based on a second data set of the different data sets while connected to a second of the at least two of the plurality of task portions. The base portion is constrained by EWC during training for at least one of the tasks.

The control component 608 may cause the automated driving/assistance system 102 to control a vehicle control system based on the outputs of the neural network component 606. For example, the outputs of each of the first task layers 204, second task layers 304, and third task layers 404 may be used to select a notification or driving maneuver to be performed by the automated driving/assistance system 102. For example, the control component 608 may select a notification to be provided to a driver or a driving maneuver to be performed by a vehicle based on the location of a detected object. A driving maneuver may include controlling steering, braking, or acceleration to avoid impact with an obstacle or to drive a driving path to a destination. A notification may include a warning of the presence of a pedestrian or other object in or near a roadway. A notification may be provided using a heads-up display, audio system, or in-dash display of the vehicle.

Figure 7:
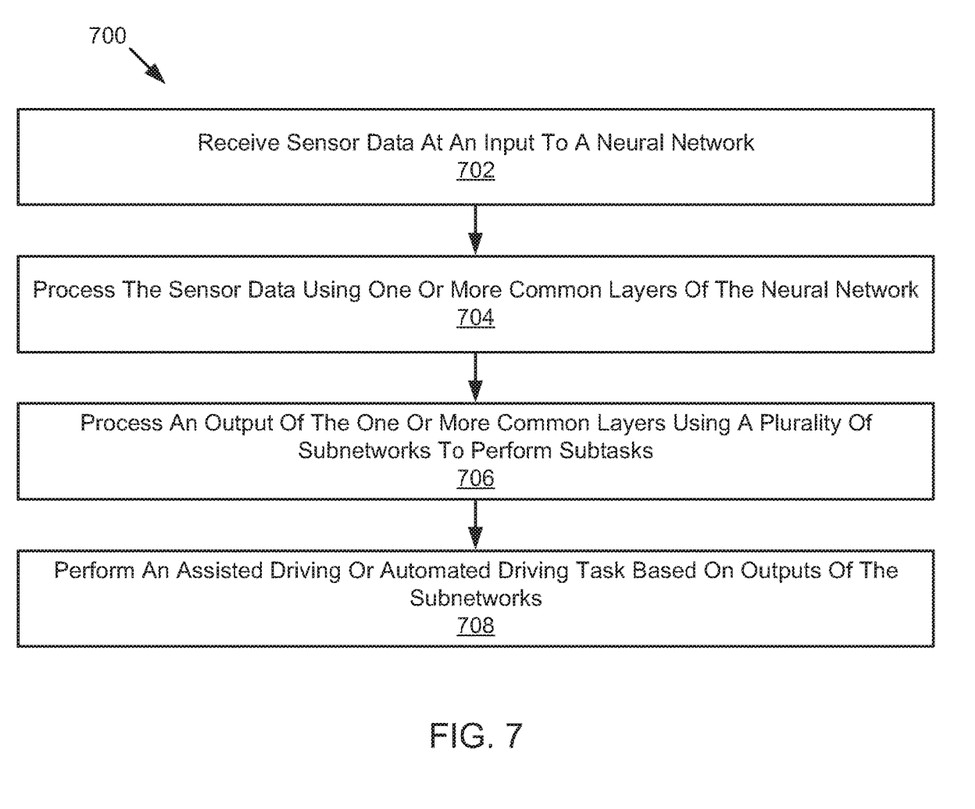
FIG. 7 is a schematic flow chart diagram illustrating a method for processing sensor data using a neural network, according to one implementation.

FIG. 7 a schematic flow chart diagram illustrating a method 700 for processing sensor data using a neural network, such as the neural network 500 of FIG. 5. For example, a processor may process an image frame, or other set of sensor data, based on the structure and weights of a neural network. The method 700 begins and a neural network 500 receives 702 sensor data at an input layer. The method 700 includes processing 704 the sensor data using one or more common layers of the neural network. For example, a processor may process the sensor data based on the weights and values of a base portion or common layers 202 of a neural network 505. For example, the common layers 202 may include layers that were sequentially trained for various tasks using EWC. The common layers 202 may include layers that process sensor data and produce an output that is used by one or more branches of a neural network. For example, a branch may include a sub-portion of a neural network that performs a sub-task such as object recognition (e.g., of a specific object type), lane detection, or image segmentation. The method includes processing 706 an output of the common layers using a plurality of sub-portions (subnetworks) to perform a plurality of different subtasks. For example, each of the first task layers 204, second task layers 304, and third task layers 404 may make up a different subnetwork or branch of the neural network. Each of the sub-portions or subnetworks may provide an output of the task indicating a classification or other result of the task. An automated driving/assistance system 102 may then perform 708 a maneuver or provide a notification to a driver based on the results of the different tasks or subtasks.

Figure 8:
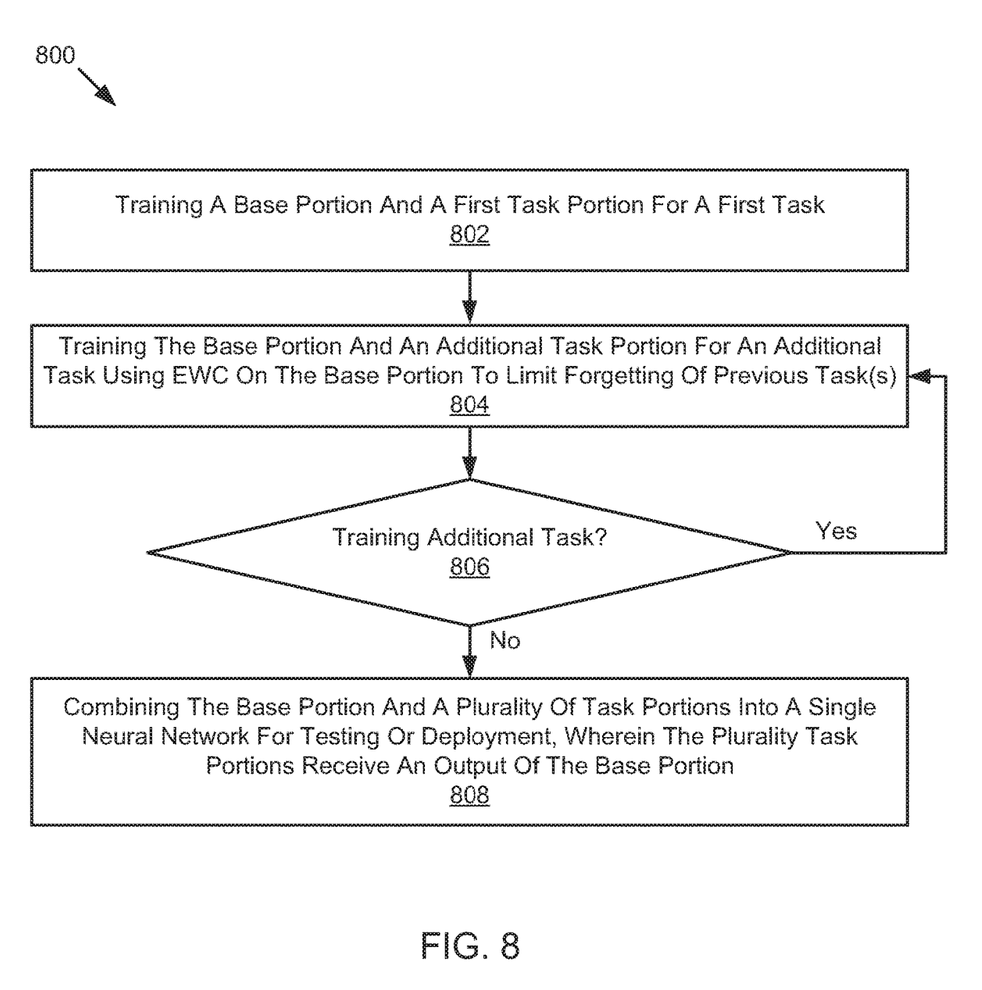
FIG. 8 is a schematic flow chart diagram illustrating a method for training a neural network, according to one implementation.

FIG. 8 a schematic flow chart diagram illustrating a method 800 for training a neural network. In one embodiment, the method 800 may be performed by a computing system in advanced of deploying in a real-world or on-line environment. The method 800 includes training 802 a base portion and a first task portion to perform a first task. The base portion comprises one or more layers or nodes that will be shared during the processing of a plurality of tasks. The base portion may include a CNN, RNN, or other deep neural network. The method includes training 804 the base portion and an additional task portion for an additional task. During training 804, EWC constraints are provided on the base portion to limit or avoid forgetting of previous tasks. The method 800 includes determining 806 whether additional tasks need to be trained. If so (Yes at 806), the method 800 trains 804 the base portion and an additional task portion for the additional task while limiting forgetting in the base portion. Training 804 the base portion and the additional task portions may be performed as many times as necessary to train all tasks. After all tasks have been trained (No at 806), the base portion will have been trained on multiple tasks using EWC and each task portion has been trained a single time for a respective task. The method 800 includes combining 808 the base portion and a plurality of the task portions into a single neural network for testing or deployment. The base portion and task portions are combined such that each of the task portions receives an output of the base portion and performs a task at least partially based on the output of the base portion.

Figure 9:
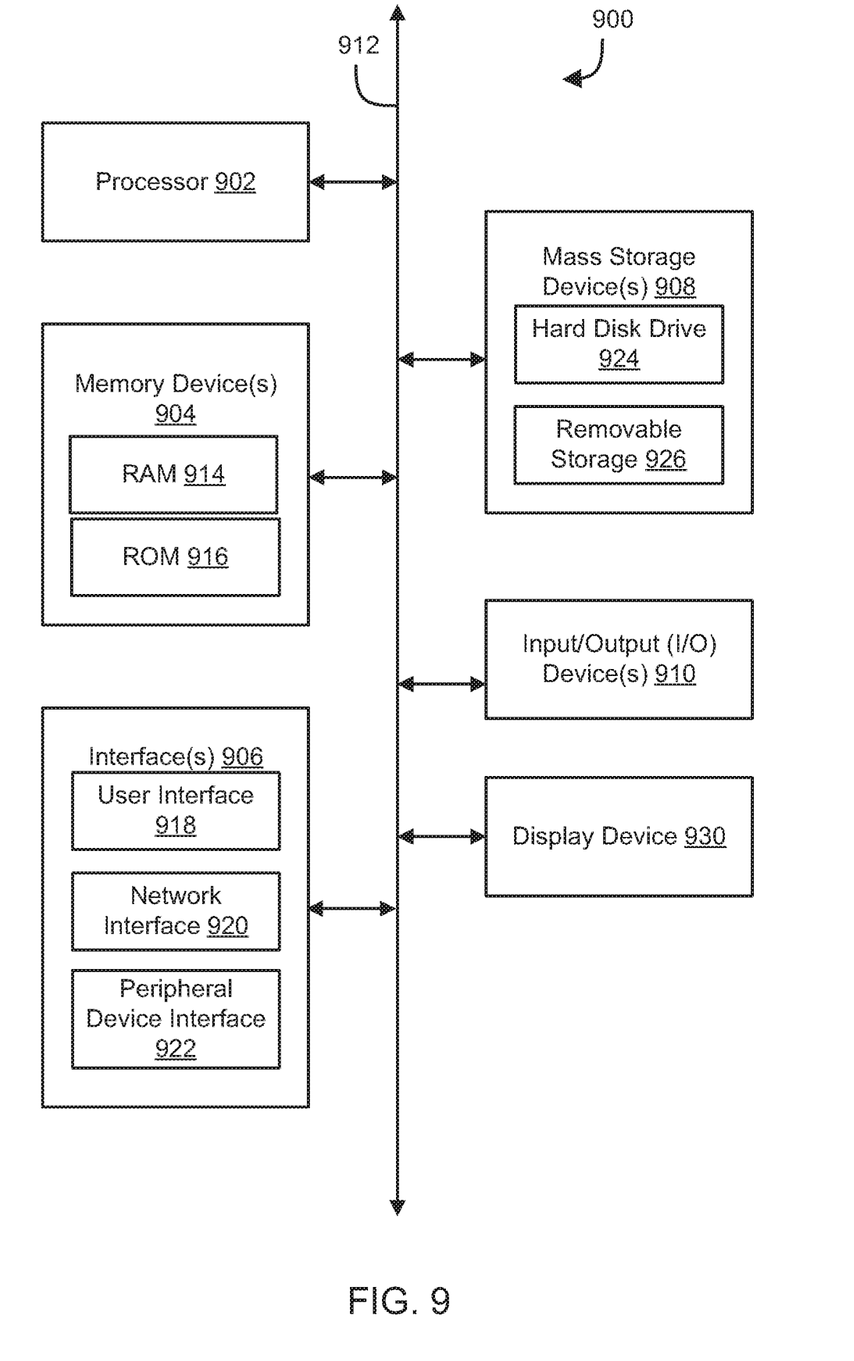
FIG. 9 is a schematic block diagram illustrating a computing system, according to one implementation.

Referring now to FIG. 9, a block diagram of an example computing device 900 is illustrated. Computing device 900 may be used to perform various procedures, such as those discussed herein. In one embodiment, the computing device 900 can function as an automated driving/assistance system 102, vehicle control system 100, neural network training system, or the like. Computing device 900 can perform various monitoring functions as discussed herein, and can execute one or more application programs, such as the application programs or functionality described herein. Computing device 900 can be any of a wide variety of computing devices, such as a desktop computer, in-dash computer, vehicle control system, a notebook computer, a server computer, a handheld computer, tablet computer and the like.

Computing device 900 includes one or more processor(s) 902, one or more memory device(s) 904, one or more interface(s) 906, one or more mass storage device(s) 908, one or more Input/Output (I/O) device(s) 910, and a display device 930 all of which are coupled to a bus 912. Processor(s) 902 include one or more processors or controllers that execute instructions stored in memory device(s) 904 and/or mass storage device(s) 908. Processor(s) 902 may also include various types of computer-readable media, such as cache memory.

Memory device(s) 904 include various computer-readable media, such as volatile memory (e.g., random access memory (RAM) 914) and/or nonvolatile memory (e.g., read-only memory (ROM) 916). Memory device(s) 904 may also include rewritable ROM, such as Flash memory.

Mass storage device(s) 908 include various computer readable media, such as magnetic tapes, magnetic disks, optical disks, solid-state memory (e.g., Flash memory), and so forth. As shown in FIG. 9, a particular mass storage device is a hard disk drive 924. Various drives may also be included in mass storage device(s) 908 to enable reading from and/or writing to the various computer readable media. Mass storage device(s) 908 include removable media 926 and/or non-removable media.

I/O device(s) 910 include various devices that allow data and/or other information to be input to or retrieved from computing device 900. Example I/O device(s) 910 include cursor control devices, keyboards, keypads, microphones, monitors or other display devices, speakers, printers, network interface cards, modems, and the like.

Display device 930 includes any type of device capable of displaying information to one or more users of computing device 900. Examples of display device 930 include a monitor, display terminal, video projection device, and the like.

Interface(s) 906 include various interfaces that allow computing device 900 to interact with other systems, devices, or computing environments. Example interface(s) 906 may include any number of different network interfaces 920, such as interfaces to local area networks (LANs), wide area networks (WANs), wireless networks, and the Internet. Other interface(s) include user interface 918 and peripheral device interface 922. The interface(s) 906 may also include one or more user interface elements 918. The interface(s) 906 may also include one or more peripheral interfaces such as interfaces for printers, pointing devices (mice, track pad, or any suitable user interface now known to those of ordinary skill in the field, or later discovered), keyboards, and the like.

Bus 912 allows processor(s) 902, memory device(s) 904, interface(s) 906, mass storage device(s) 908, and I/O device(s) 910 to communicate with one another, as well as other devices or components coupled to bus 912. Bus 912 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 900, and are executed by processor(s) 902. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

EXAMPLES

The following examples pertain to further embodiments.

Example 1 is a method that includes processing a set of sensor data using a neural network, the neural network including a base portion and a plurality of task portions, wherein the base portion receives the set of sensor data at an input layer and outputs to each of the plurality of task portions, wherein each of the plurality of task portions outputs a result of a task based on the outputs of the base portion. The method includes performing an automated or assisted driving task based on the outputs of the plurality of task portions. The base portion includes layers of a neural network sequentially trained for each of the plurality tasks, wherein the training of the base portion for at least one task is constrained by using EWC to preserve performance for a previous task.

In Example 2, the plurality of task portions in Example 1 each output the result for a different task of a plurality of tasks, at least one of the plurality of tasks including one or more of object detection, image segmentation, or lane finding.

In Example 3, the set of sensor data in any of Examples 1-2 includes a frame of sensor data captured by one or more sensors, wherein the frame of sensor data includes at least one of an RBG image, an infrared image, a frame of LIDAR data, or a frame of radar data.

In Example 4, the method in any of Examples 1-3 includes sequentially train the base portion for different tasks while connected to corresponding task portions.

In Example 5, the at least two of the plurality of task portions in any of Examples 1-4 are trained on different data sets. The base portion includes columns or nodes trained on the different data sets by training for a first task based on a first data set of the different data sets while connected to a first of the at least two of the plurality of task portions and training for a second task based on a second data set of the different data sets while connected to a second of the at least two of the plurality of task portions. The base portion is constrained by EWC during training for at least one of the tasks.

In Example 6, the method in any of Examples 1-5 includes performing the automated or assisted driving task includes performing a driving maneuver.

In Example 7, the performing the automated or assisted driving task in any of Examples 1-6 includes providing a notification to a driver.

In Example 8, the base portion in any of Examples 1-7 includes a CNN.

Example 9 is a system including a processor for performing one or more autonomous driving or assisted driving tasks based on a neural network. The neural network includes a base portion for performing feature extraction simultaneously for a plurality of tasks on a single set of input data. The system includes a plurality of subtask portions for performing the plurality of tasks based on feature extraction output from the base portion. Each of the plurality of subtask portions include nodes or layers of a neutral network trained on different sets of training data, and the base portion includes nodes or layers of a neural network trained using each of the different sets of training data constrained by elastic weight consolidation to limit the base portion from forgetting a previously learned task.

In Example 10, the system of Example 9 further includes a sensor for obtaining sensor data, wherein the sensor includes one or more of a camera, a LIDAR system, and a radar system.

In Example 11, the system in any of Examples 9-10 further includes a control system for controlling one or more actuators, displays, or audio systems of a vehicle.

In Example 12, the base portion and the plurality of subtask portions in any of Examples 9-11 provide output based on a single set of input data.

In Example 13, the base portion in any of Examples 9-12 includes a CNN.

In Example 14, the base portion in any of Examples 9-12 includes an RNN.

In Example 15, the plurality of subtask portions in any of Examples 9-14 output the result for a different of the plurality of tasks, the plurality of tasks including two or more of object detection, image segmentation, and lane finding.

Example 16 is a method for training a neural network for a plurality of deep learning tasks. The method includes training a common portion of a neural network and a first task portion for a first task. The method includes training the common portion and a second task portion to perform a second task, wherein the common portion is constrained using EWC to retain memory for performing feature extraction for the first task. The training for the first task includes training with the first task portion receiving the output of the common portion and the second task portion not connected, and training for the second task includes training with the second task portion receiving the output of the common portion and the first task portion not connected.

In Example 17, the training for the first task of Example 16 includes training using a first set of training data labeled for the first task, and wherein training for the second task includes training using a second set of training data labeled for the second task.

In Example 18, the method in any of Examples 16-17 further includes connecting the first task portion and the second task portion to the common portion during testing or deployment, wherein the common portion simultaneously performs feature extraction for both the first task and the second task and provides output to both the first task portion and the second task portion, wherein the output is the result of feature extraction for both the first task and the second task.

In Example 19, the method in any of Examples 16-28 further includes determining which weights are important for a specific task and applying EWC constraints to those tasks during training for one or more subsequent tasks.

In Example 20, the first task or the second task in any of Examples 16-19 includes one or more of object detection, image segmentation, and lane finding.

Example 21 is computer readable storage media storing instructions that, when executed by one or more processors, cause the one or more processors to implement a method or realize a system or apparatus as in any of Examples 1-20.

Example 22 is a system or device that includes means for implementing a method or realizing a system or apparatus as in any of Examples 1-20.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium, which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. The terms "modules" and "components" are used in the names of certain components to reflect their implementation independence in software, hardware, circuitry, sensors, or the like. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method comprising:
    training a common layer of a neural network, wherein the common layer is trained during training for each of a first task layer of the neural network and a second task layer of the neural network, and wherein training the common layer comprises:
        training the common layer with a first training dataset comprising a plurality of images comprising a first label, wherein the first label is associated with a first task, and wherein the first task layer of the neural network is trained to execute the first task; and
        training the common layer with a second training dataset comprising a plurality of images comprising a second label, wherein the second label is associated with a second task, and wherein the second task layer of the neural network is trained to execute the second task; and
    wherein the common layer is trained to perform feature extraction on an input image during deployment of the neural network to generate a feature extraction common output;
    wherein the first task layer receives the feature extraction common output during deployment of the neural network and performs the first task based on the feature extraction common output;
    wherein the second task layer receives the feature extraction common output during deployment of the neural network and performs the second task based on the feature extraction common output;
    wherein each of the first task and the second task comprises one of object detection, image segmentation, lane detection, driving surface detection, or driving condition detection;
    wherein the first task layer and the second task layer operate simultaneously after receiving the feature extraction common output from the common layer;
    wherein the common layer, the first task layer, and the second task layer are independent layers of the neural network such that the first task layer and the second task layer are sublayers to the common layer; and
    wherein only the common layer of the neural network is constrained using elastic weight consolidation (EWC) to retain memory for performing the feature extraction on the input image during deployment.

2. The method of claim 1, further comprising training the first task layer of the neural network with the first training dataset and training the second task layer of the neural network with the second training dataset.

3. The method of claim 2, wherein:
    training the first task layer of the neural network comprises providing an output of the common layer of the neural network to the first task layer; and
    training the second task layer of the neural network comprises providing the output of the common layer of the neural network to the second task layer;
    the method further comprises connecting the first task layer and the second task layer to the common layer during testing or deployment;
    the common layer simultaneously performs feature extraction for both the first task and the second task and provides output to both the first task layer and the second task layer; and
    the output of the neural network is a result of feature extraction for both the first task and the second task.

4. The method of claim 1, further comprising determining which weights are important for a specific task and applying EWC constraints to those tasks during training for one or more subsequent tasks.

5. The method of claim 1, further comprising:
    deploying the common layer to perform the feature extraction on a new image captured by a camera of a vehicle;
    deploying the first task layer to perform one of the object detection, image segmentation, lane detection, driving surface detection, or driving condition detection on the new based at least in part of the feature extraction performed by the common layer;
    deploying the second task layer to perform one of the object detection, image segmentation, lane detection, driving surface detection, or driving condition detection on the new based at least in part of the feature extraction performed by the common layer.

6. The method of claim 5, wherein the first task layer performs the first task and the second task layer performs the second task simultaneously during deployment.

7. The method of claim 1, wherein the common layer of the neural network is trained to perform the feature extraction in preparation for each of the first task and the second task, wherein the first task and the second task comprise different tasks for analyzing an image captured in a driving environment.

8. A non-transitory computer readable storage media storing instructions for execution by one or more processors, the instructions comprising:
    processing image sensor data with a neural network comprising a common layer and a plurality of task layers, wherein the plurality of task layers comprise a first task layer and a second task layer, and wherein processing the sensor data comprises:
        the common layer receiving an input image as an input;
        the common layer performing feature extraction on the input image and outputting a feature extraction common output;
        the first task layer of the neural network receiving the feature extraction common output as a first task input, wherein the first task layer is trained to execute a first task;
        the first task layer generating a first task output based on the first task;
        the second task layer of the neural network receiving the feature extraction common output as a second task input, wherein the second task layer is trained to execute a second task; and
        the second task layer generating a second task output based on the second task; and
    performing an automated or assisted driving task based on the first task output and the second task output;
    wherein each of the first task and the second task comprises one of object detection, image segmentation, lane detection, driving surface detection, or driving condition detection;
    wherein the common layer of the neural network is trained with a first training dataset comprising a plurality of images comprising a first label during training of the first task layer, and the common layer is trained with a second training dataset comprising a plurality of images comprising a second label during training of the second task layer;

wherein the common layer, the first task layer, and the second task layer are independent layers of the neural network such that the first task layer and the second task layer are sublayers to the common layer;

wherein only the common layer of the neural network is constrained by elastic weight consolidation (EWC) to retain memory for performing the feature extraction on the input image.

9. The non-transitory computer readable storage media of claim 8, wherein the image sensor data comprises a frame of sensor data captured by one or more image sensors, and wherein the frame of image sensor data comprises one or more of:
a red-green-blue (RGB) image;
an infrared image;
a frame of light detection and ranging (LIDAR) data; or
a frame of radar data.

10. The non-transitory computer readable storage media of claim 8, wherein the instructions further comprise sequentially training the common layer of the neural network to execute different tasks while connected to corresponding task layers of the neural network.

11. The non-transitory computer readable storage media of claim 8, wherein at least two of the plurality of task layers of the neural network are trained on different datasets, wherein the common layer of the neural network comprises columns or nodes trained on the different datasets, wherein training the common layer of the neural network comprises:
training the common layer to execute the first task based on the first dataset while connected to the first task layer; and
training the common layer to execute the second task based on the second dataset while connected to the second task layer;
wherein the common layer is constrained by the EWC during training for at least one of the first task or the second task.

12. The non-transitory computer readable storage media of claim 8, wherein performing the automated or assisted driving task comprises performing a driving maneuver with a vehicle.

13. The non-transitory computer readable storage media of claim 8, wherein performing the automated or assisted driving task comprises providing a notification to a driver.

14. The non-transitory computer readable storage media of claim 8, wherein the common layer of the neural network comprises a convolutional neural network (CNN).

15. A system comprising a processor for performing one or more autonomous driving or assisted driving tasks based on a neural network, the neural network comprising:
a common layer for performing feature extraction on an image, wherein a feature extraction common output from the common layer is used simultaneously for a plurality of tasks based on a single set of input data; and
a plurality of subtask portions for performing the plurality of tasks based on the feature extraction common output from the common layer;
wherein each of the plurality of subtask portions comprise nodes or layers of the neural network;
wherein the plurality of tasks performed by the plurality of subtask portions comprises object detection, image segmentation, lane detection, driving surface detection, and driving condition detection;
wherein each of the plurality of subtask portions is trained on different sets of training data such that a first task layer is trained on a first dataset and a second task layer is trained on a second dataset;
wherein the common layer, the first task layer, and the second task layer are independent layers of the neural network such that the first task layer and the second task layer are sublayers to the common layer;
wherein the common layer of the neural network is trained using each of the different sets of training data; and
wherein only the common layer is constrained by elastic weight consolidation (EWC) to retain memory for performing the feature extraction on the image and to limit the common layer from forgetting a previously learned task.

16. The system of claim 15, further comprising a sensor for obtaining sensor data, wherein the sensor comprises one or more of a camera, a LIDAR system, or a radar system.

17. The system of claim 15, further comprising a control system configured to control one or more actuators, displays, or audio systems of a vehicle.

18. The system of claim 15, wherein the common layer of the neural network and the plurality of subtask portions of the neural network each generate an output based on a single set of input data.

19. The system of claim 15, wherein the common layer of the neural network comprises a convolutional neural network (CNN).

20. The system of claim 15, wherein the common layer of the neural network comprises a recurrent neural network (RNN).

* * * * *